United States Patent
Nakatsukasa et al.

(10) Patent No.: US 11,797,291 B2
(45) Date of Patent: Oct. 24, 2023

(54) SOFTWARE UPDATE MANAGEMENT DEVICE AND SOFTWARE UPDATE MANAGEMENT METHOD

(71) Applicant: Nippon Telegraph and Telephone Corporation, Tokyo (JP)

(72) Inventors: Satoshi Nakatsukasa, Musashino (JP); Masatoshi Saito, Musashino (JP); Hiroki Mori, Musashino (JP); Ken Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 282 days.

(21) Appl. No.: 17/429,784

(22) PCT Filed: Feb. 4, 2020

(86) PCT No.: PCT/JP2020/004032
§ 371 (c)(1),
(2) Date: Aug. 10, 2021

(87) PCT Pub. No.: WO2020/170794
PCT Pub. Date: Aug. 27, 2020

(65) Prior Publication Data
US 2022/0137950 A1    May 5, 2022

(30) Foreign Application Priority Data
Feb. 18, 2019  (JP) .................................. 2019-026168

(51) Int. Cl.
*G06F 8/65*    (2018.01)
*G06F 8/41*    (2018.01)
(Continued)

(52) U.S. Cl.
CPC ................ *G06F 8/65* (2013.01); *G06F 8/451* (2013.01); *G06F 9/505* (2013.01); *G06F 3/123* (2013.01); *H04W 52/0219* (2013.01)

(58) Field of Classification Search
CPC . G06F 9/505; G06F 8/65; G06F 8/451; G06F 3/123; H04W 52/0219
See application file for complete search history.

(56) References Cited

U.S. PATENT DOCUMENTS

2008/0229322 A1* 9/2008 Berstis .................... G06F 9/505
718/106
2014/0068597 A1 3/2014 Hirahara
(Continued)

FOREIGN PATENT DOCUMENTS

JP    H06319163    11/1994
JP    H0950382    2/1997
(Continued)

OTHER PUBLICATIONS

JP 5209885, "Order Information Management Apparatus", translation, Jun. 12, 2013, 14 pgs < JP_5209885.pdf>.*

*Primary Examiner* — Tuan A Vu
(74) *Attorney, Agent, or Firm* — Fish & Richardson P.C.

(57) ABSTRACT

A software update management apparatus includes a storage unit adapted to divide a network into one or more blocks and store block management information indicating whether each of network devices belonging to each of the resulting blocks is an active device or a standby device; an update instruction receiving unit adapted to receive software update instructions; a software update information generating unit adapted to generate software update information; a software updating unit adapted to perform software update processes after transferring traffic to standby devices in same blocks as respective active devices when it is determined that the network devices are active devices according to the software (Continued)

update information and thereby perform the software update processes for active devices or standby devices in different blocks in parallel.

7 Claims, 15 Drawing Sheets

(51) Int. Cl.
  *G06F 9/50*      (2006.01)
  *G06F 3/12*      (2006.01)
  *H04W 52/02*     (2009.01)

(56) References Cited

U.S. PATENT DOCUMENTS

2014/0337840 A1* 11/2014 Hyde ................ H04W 52/0219
                                                      370/254
2018/0060061 A1   3/2018 Savagaonkar et al.

FOREIGN PATENT DOCUMENTS

| | | |
|---|---|---|
| JP | 2008269479 | 11/2008 |
| JP | 2014052793 | 3/2014 |

* cited by examiner

100 BLOCK MANAGEMENT INFORMATION

| BLOCK (ID) | ACTIVE DEVICE (DEVICE ID) | STANDBY DEVICE (DEVICE ID) |
|---|---|---|
| 1 | 1, 2, 3, 4, 5, 6, 7 | 8, 9, 10 |
| 2 | 11, 12, ··· | ··· |
| 3 | ··· | ··· |
| ⋮ | ⋮ | ⋮ |

200 SOFTWARE UPDATE INFORMATION

| DEVICE | UPDATE TIME | COMMAND FILE STORAGE LOCATION | IMAGE FILE STORAGE LOCATION |
|---|---|---|---|
| a | YYYYMMDD_hhmmss | /home/tmp | /home/os |
| b | YYYYMMDD_hhmmss | /home/tmp | — |
| ⋮ | ⋮ | ⋮ | ⋮ |

| BLOCK | SIMULTANEOUS SOFTWARE UPDATE COUNT | IN-BLOCK UNAVAILABILITY $W_i$ |
|---|---|---|
| 1 | 17 | 2.17046E-07 |
| 2 | 13 | 3.01722E-07 |
| 3 | 8 | 3.01722E-07 |
| 4 | 8 | 6.80425E-08 |
| 5 | 8 | 3.03253E-09 |
| UNAVAILABILITY OF ENTIRE NETWORK W | | $0.000000891 < \alpha_{target}$ |

SOFTWARE UPDATE MANAGEMENT DEVICE AND SOFTWARE UPDATE MANAGEMENT METHOD

CROSS-REFERENCE TO RELATED APPLICATIONS

This application is a National Stage application under 35 U.S.C. § 371 of International Application No. PCT/JP2020/004032, having an International Filing Date of Feb. 4, 2020, which claims priority to Japanese Application Serial No. 2019-026168, filed on Feb. 18, 2019. The disclosure of the prior application is considered part of the disclosure of this application, and is incorporated in its entirety into this application.

TECHNICAL FIELD

The present invention relates to a software update management apparatus and a software update management method.

BACKGROUND ART

Conventionally, in a redundant system made up of a working system and backup system, the backup system is loaded with a new program for software update, takes over working data of the working system, then stops the working system, and thereby replaces the working system. Consequently, in the redundant system, the current working system is updated after the back-up system is updated, making it possible to modify a program or add a service without stopping the service of the entire system (see, for example, Patent Literature 1).

In a network operated by a common carrier or large-scale data center, more than several hundred to several thousand million switches (hereinafter referred to as "network devices") are interconnected. FIG. 16 is a diagram showing a network of a spine-leaf architecture used in data centers and the like. Here, switches adapted to house servers are referred to as leaf switches and are connected to a ToR (top of rack) switch connected with the servers. Also, a switch adapted to interconnect the leaf switches is referred to as a spine switch. Under existing circumstances, in a large-scale network such as shown in FIG. 16, a software update operation is performed by dividing the network into switch groups connected with ToR switches in a redundant configuration such that server users and traffic will not be affected.

CITATION LIST

Patent Literature

Patent Literature 1: Japanese Patent Laid-Open No. 09-050382

SUMMARY OF THE INVENTION

Technical Problem

The networks used by common carriers or large-scale data centers needs very high reliability. When software is updated by switching network devices between active devices and standby devices as with a conventional software update technique, this means that the number of devices available for use as backups are reduced during software update. This reduces the reliability of the entire network during software update. In this regard, although the conventional technique does scheduling to perform software update operations in parallel by dividing the network, basically the scheduling is done manually by operators and the reliability of the network is not guaranteed sufficiently by the parallelization of the software update operations.

Also, an automation technique has not been established in preventing prolongation of the software update operations including OS upgrades intended to fix bugs and add new functions in/to network devices of a large-scale network and performing the software update operations efficiently.

The present invention has been made in view of the above points and has an object to provide a software update management apparatus and software update management method that ensure efficiency of software update operations while maintaining the reliability of an entire network during the software update operations.

Means for Solving the Problem

To achieve the above object, the invention set forth in claim 1 is a software update management apparatus that updates software in a plurality of network devices making up a network, the software update management apparatus comprising: a storage unit adapted to divide the network into one or more blocks and store block management information, which includes information about the network devices belonging to each of the resulting blocks and information indicating whether each of the network devices is an active device or a standby device; an update instruction receiving unit adapted to receive software update instructions containing devices subject to software update, which are network devices subject to software update, and a software update time, which is a start time of a software update process for each of the devices subject to software update; a software update information generating unit adapted to generate software update information including the software update time associated with each of the devices subject to software update, based on the received software update instructions; and a software updating unit adapted to determine whether each of the devices subject to software update is an active device or a standby device based on the block management information when the software update time comes according to the software update information, perform software update processes after transferring traffic that is being processed by the devices subject to software update, which are active devices, to standby devices in same blocks as the respective active devices when it is determined that the devices subject to software update are active devices or perform software update processes for the devices subject to software update, which are standby devices, when it is determined that the devices subject to software update are standby devices, and thereby perform the software update processes for active devices or standby devices in different blocks in parallel.

Also, the invention set forth in claim 4 is a software update management method for a software update management apparatus that updates software in a plurality of network devices making up a network, wherein the software update management apparatus includes a storage unit adapted to divide the network into one or more blocks and store block management information, which includes information about the network devices belonging to each of the resulting blocks and information indicating whether each of the network devices is an active device or a standby device, the software update management method executing the steps of: receiving software update instructions containing devices subject to software update, which are network devices subject to software update, and a software update time, which is a start time of a software update process for each of the devices subject to software update; generating software update information including the software update time associated with each of the devices subject to software update, based on the received software update instructions; and determining whether each of the devices subject to software update is an active device or a standby device based on the block management information when the software update time comes according to the software update information, performing software update processes after transferring traffic that is being processed by the devices subject to software update, which are active devices, to standby devices in same blocks as the respective active devices when it is determined that the devices subject to software update are active devices or performing software update processes for the devices subject to software update, which are standby devices when it is determined that the devices subject to software update are standby devices, and thereby performing a software update process for active devices or standby devices in different blocks in parallel.

Consequently, on a network to be controlled, the software update management apparatus can automatically update software in the network devices to be updated on a block by block basis, i.e., simultaneously in the plural network devices, without affecting traffic. This makes it possible to perform software update operations more efficiently than conventional manual operations.

The invention set forth in claim 2 is a software update management apparatus that updates software in a plurality of network devices making up a network, the software update management apparatus comprising: a storage unit adapted to divide the network into one or more blocks and store block management information, which includes information about the network devices belonging to each of the resulting blocks and information indicating whether each of the network devices is an active device or a standby device, unavailability of each individual one of the network devices, and target unavailability of the entire network; an update instruction receiving unit adapted to receive update-every-network-device instructions containing information indicating that all the network devices in the network are subject to software update; a simultaneous update count calculation unit adapted to calculate unavailability of the entire network by a predetermined technique that uses the block management information and the unavailability of each individual one of the network devices and thereby calculate a simultaneous software update count on a block by block basis such that the unavailability of the entire network is kept equal to or lower than the target unavailability of the entire network, the simultaneous software update count indicating a maximum number of network devices able to be updated by one software update; an update schedule information generating unit adapted to generate update schedule information by selecting network devices in each of the blocks, where the selected network devices update software in each software update session, the software being updated in the number of network devices indicated by the simultaneous software update count calculated for each of the blocks; and a software updating unit adapted to perform software update processes for the selected network devices in each software update session with reference to the update schedule information by performing the software update processes in different blocks in parallel.

Also, the invention set forth in claim 5 is a software update management method for a software update management apparatus that updates software in a plurality of network devices making up a network, wherein the software update management apparatus includes a storage unit adapted to divide the network into one or more blocks and store block management information, which includes information about the network devices belonging to each of the resulting blocks and information indicating whether each of the network devices is an active device or a standby device, unavailability of each individual one of the network devices, and target unavailability of the entire network, the software update management method executing the steps of: receiving update-every-network-device instructions containing information indicating that all the network devices in the network are subject to software update; calculating unavailability of the entire network by a predetermined technique that uses the block management information and the unavailability of each individual one of the network devices and thereby calculating a simultaneous software update count on a block by block basis such that the unavailability of the entire network is kept equal to or lower than the target unavailability of the entire network, the simultaneous software update count indicating a maximum number of network devices able to be updated by one software update; generating update schedule information by selecting network devices in each of the blocks, where the selected network devices update software in each software update session, the software being updated in the number of network devices indicated by the simultaneous software update count calculated for each of the blocks; and performing software update processes for the selected network devices in each software update session with reference to the update schedule information by performing the software update processes in different blocks in parallel.

Consequently, the software update management apparatus can ensure efficiency of software update operations while maintaining the reliability of the entire network during the software update operations. That is, the software update management apparatus makes it possible to generate and implement a software update schedule that can minimize the time required for software update without exceeding the target unavailability of the entire network.

According to the invention set forth in claim 3, in the software update management apparatus set forth in claim 2, during the software update processes, the software updating unit determines whether each of the network devices in which the software is updated is an active device or a standby device based on the block management information, and performs a software update process after transferring traffic that is being processed by the network devices, which are active devices, to standby devices in the same blocks as the respective active devices when it is determined that the network devices are active devices or perform software update processes for the network devices, which are standby devices, when it is determined that the network devices are standby devices.

Consequently, on a network to be controlled, the software update management apparatus can automatically update software in the network devices on a block by block basis, i.e., simultaneously in the plural network devices, without affecting traffic.

Effects of the Invention

The present invention provides a software update management apparatus and software update management method that can ensure efficiency of software update operations while maintaining the reliability of the entire network during the software update operations.

DESCRIPTION OF EMBODIMENTS

A mode for carrying out the present invention (hereinafter referred to as "the present embodiment") will be described next.

Figure 1:
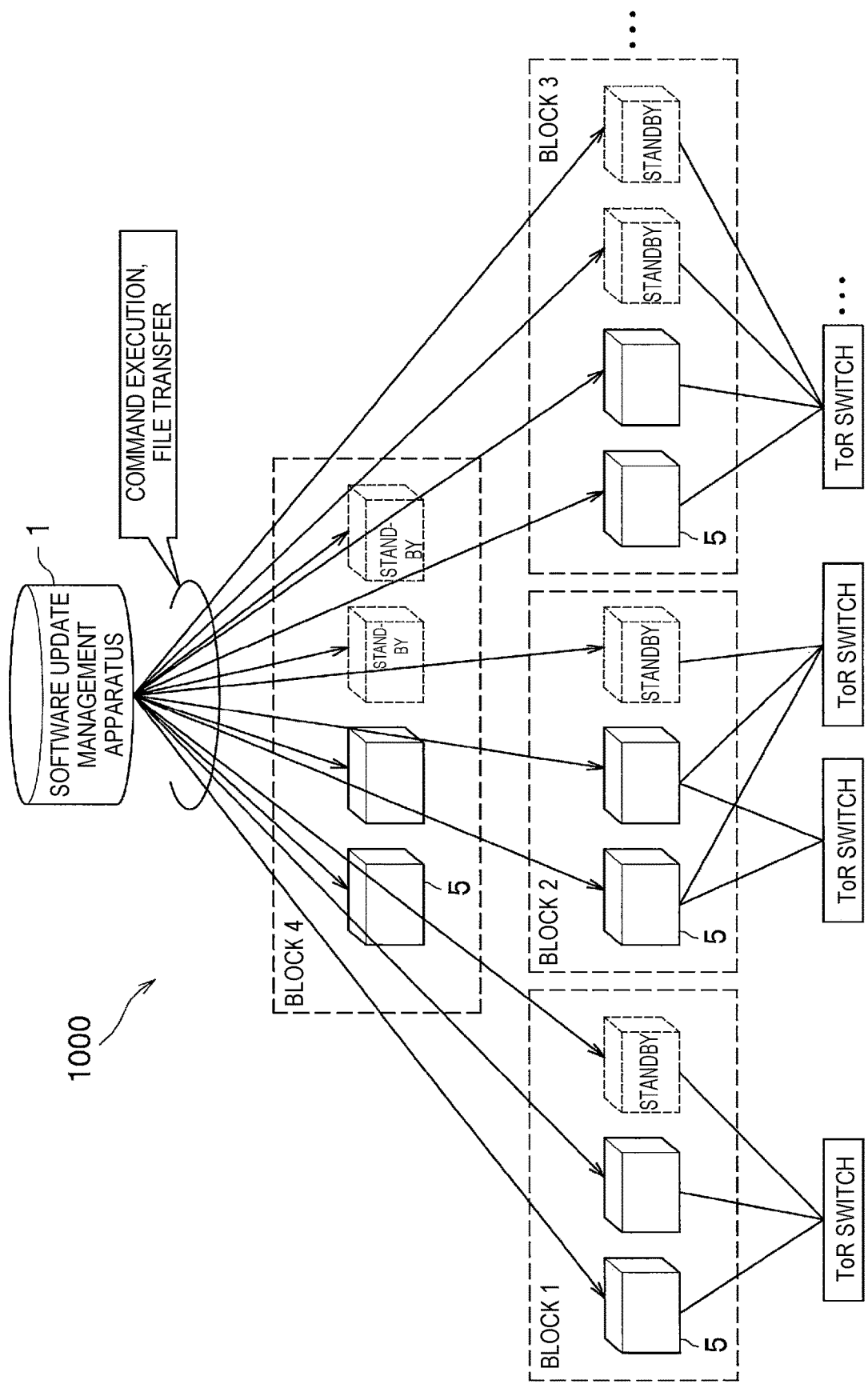
FIG. 1 is a diagram showing a configuration of a network management system including a software update management apparatus according to the present embodiment.

FIG. 1 is a diagram showing a configuration of a network management system 1000 including a software update management apparatus 1 according to the present embodiment.

Figure 16:
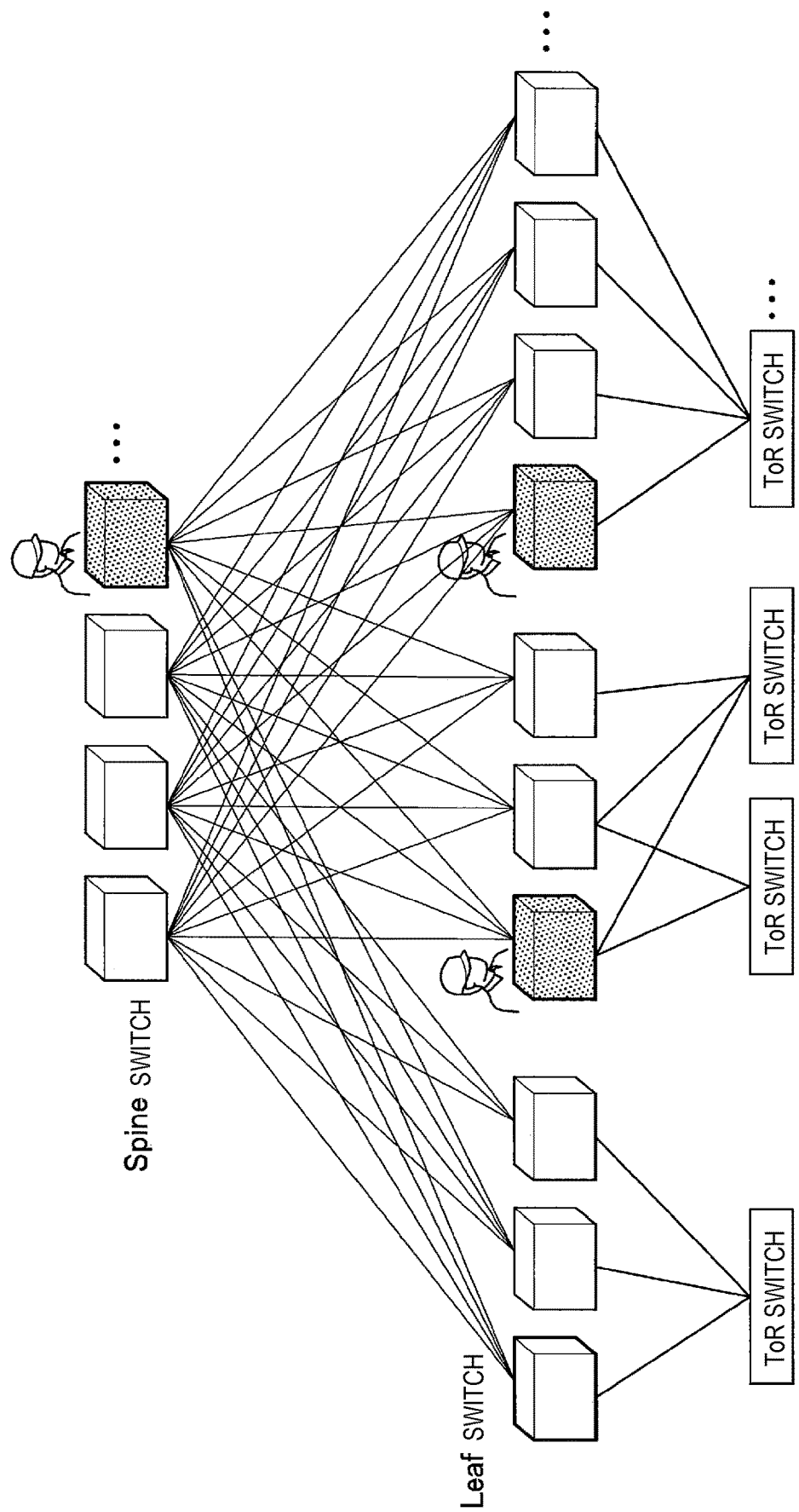
FIG. 16 is a diagram showing a software update technique for network devices on a conventional large-scale network.

The software update management apparatus 1 according to the present embodiment updates software in the network devices 5 on a network in which more than several hundred to several thousand switches (network devices 5) operated by a common carrier or large-scale data center are interconnect by a spine-leaf architecture, for example, as shown in FIG. 16. Note that the lines, such as shown in FIG. 16, interconnecting the network devices 5 are omitted in FIG. 1. Also, the architecture of the network devices 5 handled by the software update management apparatus 1 is not limited to the spine-leaf architecture.

The software update management apparatus 1 is connected with the network devices 5 in the network management system 1000 via a communications link and executes commands or transfers files with respect to the network devices 5. Also, as shown in FIG. 1, the software update management apparatus 1 manages the network to be controlled, by dividing the network into one or more blocks. Then, it is assumed that each block includes one or more active devices that process traffic in normal times and one or more standby devices that process the traffic in case of failure of the active devices or during software update.

Software updates carried out for the network devices 5 in the network by the software update management apparatus 1 according to the present embodiment will be described hereinafter in first and second embodiments.

First Embodiment

First, the network management system 1000 including a software update management apparatus 1A (see FIG. 2 described later) according to a first embodiment will be described. Note that the overall configuration of the first embodiment is similar to the system shown in FIG. 1.

The software update management apparatus 1A according to the first embodiment has the following features.

The software update management apparatus 1A holds block management information 100, (see FIG. 3 described later), which is information obtained by dividing the network to be controlled into one or more blocks in processing a command group to be executed during software update for the network devices 5, in upgrading an OS, or the like. The block management information 100 contains information about the active devices and standby devices belonging to each block. The software update management apparatus 1A receives information ("software update instructions 20" described later) from a maintenance person (specifically, for example, an operator terminal (not shown) or the like), the information instructing software update and including identification information about each network device subject to software update and a start time of a software update process. Then, when the start time comes, the software update management apparatus 1A transfers the traffic of the network device 5 to a standby device, executes a software update command group, further transfers a specified OS image file, thereby upgrading the OS, and returns the transferred traffic from the standby device to the original network device.

Consequently, in the network to be controlled, the software update management apparatus 1A according to the first embodiment can automatically update software in the network devices 5 under its management simultaneously on a block by block basis without affecting the traffic. This makes it possible to ensure efficiency of software update operations.

<<Software Update Management Apparatus 1A>>

Figure 2:
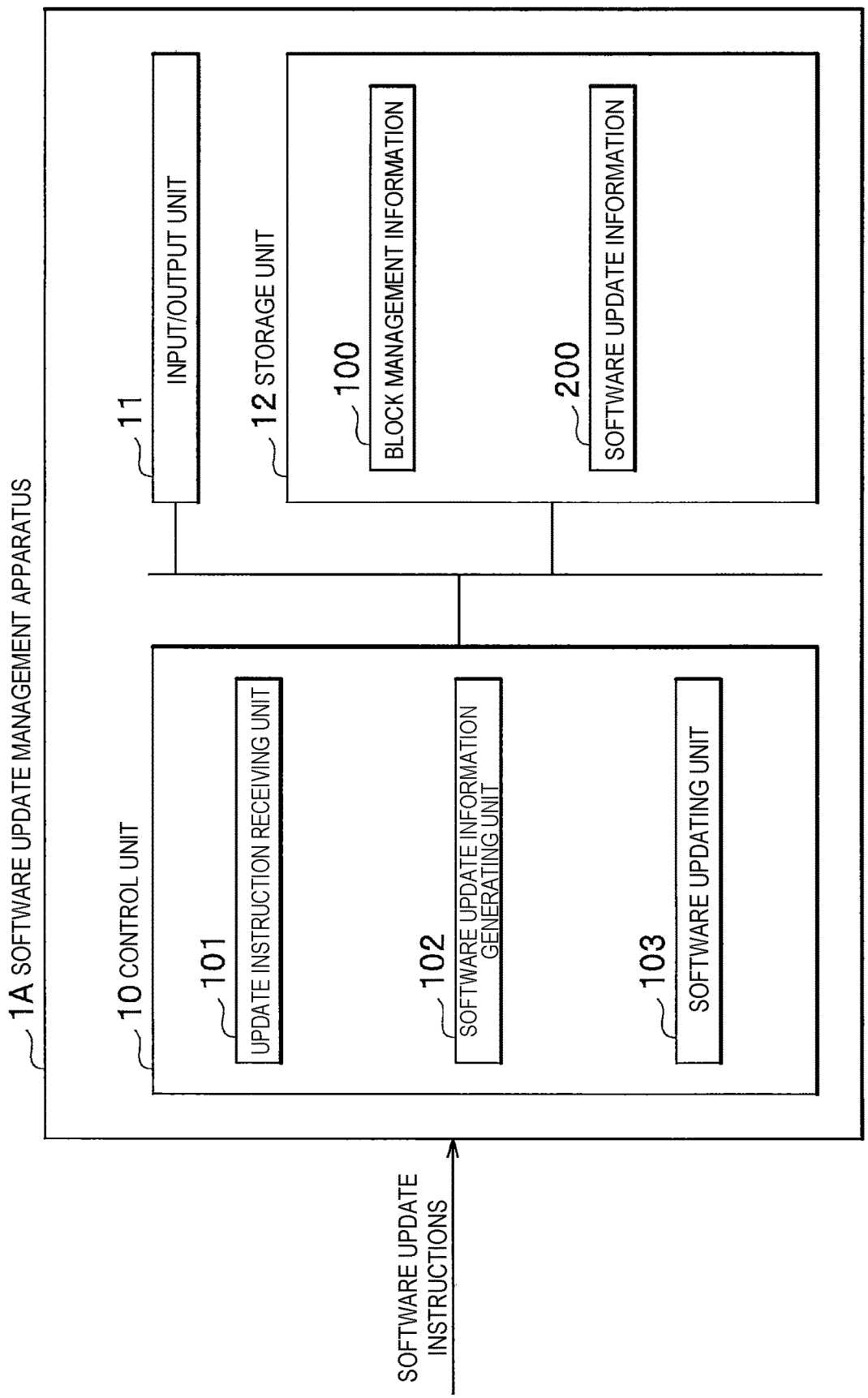
FIG. 2 is a functional block diagram showing a configuration example of a software update management apparatus according to a first embodiment of the present invention.

FIG. 2 is a functional block diagram showing a configuration example of the software update management apparatus 1A according to the first embodiment of the present invention.

Figure 3:
FIG. 3 is a diagram showing an exemplary data organization of block management information according to the present embodiment.

The software update management apparatus 1A holds the block management information 100, which is information obtained by dividing the network to be controlled into blocks (FIG. 3). Upon receiving software update instructions 20 (see FIG. 4) from the operator terminal or the like, the software update management apparatus 1A performs a software update process for each network device 5 based on the instructions.

As shown in FIG. 2, the software update management apparatus 1A includes a control unit 10, an input/output unit 11, and a storage unit 12.

The input/output unit 11 is made up of a communications interface for use to exchange information with the operator terminal (not shown) and the network devices 5 (see FIG. 1), an input device such as a touch panel or keyboard, and an input/output interface for use to exchange information with an output device such as a monitor.

The storage unit 12 is made up of a flash memory, a hard disk, a RAM (Random Access Memory), and the like. The storage unit 12 of the software update management apparatus 1A stores block management information 100 (FIG. 3) and software update information 200 (FIG. 5) described later. Also, the storage unit 12 temporarily stores programs for use to make the control unit 10 execute various functions and information needed for processes of the control unit 10.

FIG. 3 is a diagram showing an exemplary data organization of the block management information 100 according to the present embodiment.

The block management information 100 contains information indicating the active devices and standby devices belonging to each block. Specifically, as shown in FIG. 3, device IDs of the active devices and standby devices out of the network devices 5 belonging to the block are stored by being associated with block identification information (ID). For example, as shown on the first line, the active devices (network devices 5) with device IDs of "1" to "7" and standby devices (network devices 5) with device IDs of "8" to "10" belong to block "1."

The block management information 100 is set in advance by a maintenance person (operator) or the like of the network. Also, the division into blocks is made only to the extent that smoothness of communications in another block would not be affected when an active device and standby device among the network devices 5 in the block are switched with each other.

Returning to FIG. 2, the control unit 10, which takes charge of overall processes of the software update management apparatus 1A, includes an update instruction receiving unit 101, a software update information generating unit 102, and a software updating unit 103.

From the operator terminal (not shown) or the like, the update instruction receiving unit 101 receives software update instructions 20 containing identification information about each network device 5 subject to software update and the start time of the software update process. Then, the update instruction receiving unit 101 outputs the received software update instructions 20 to the software update information generating unit 102.

Figure 4:
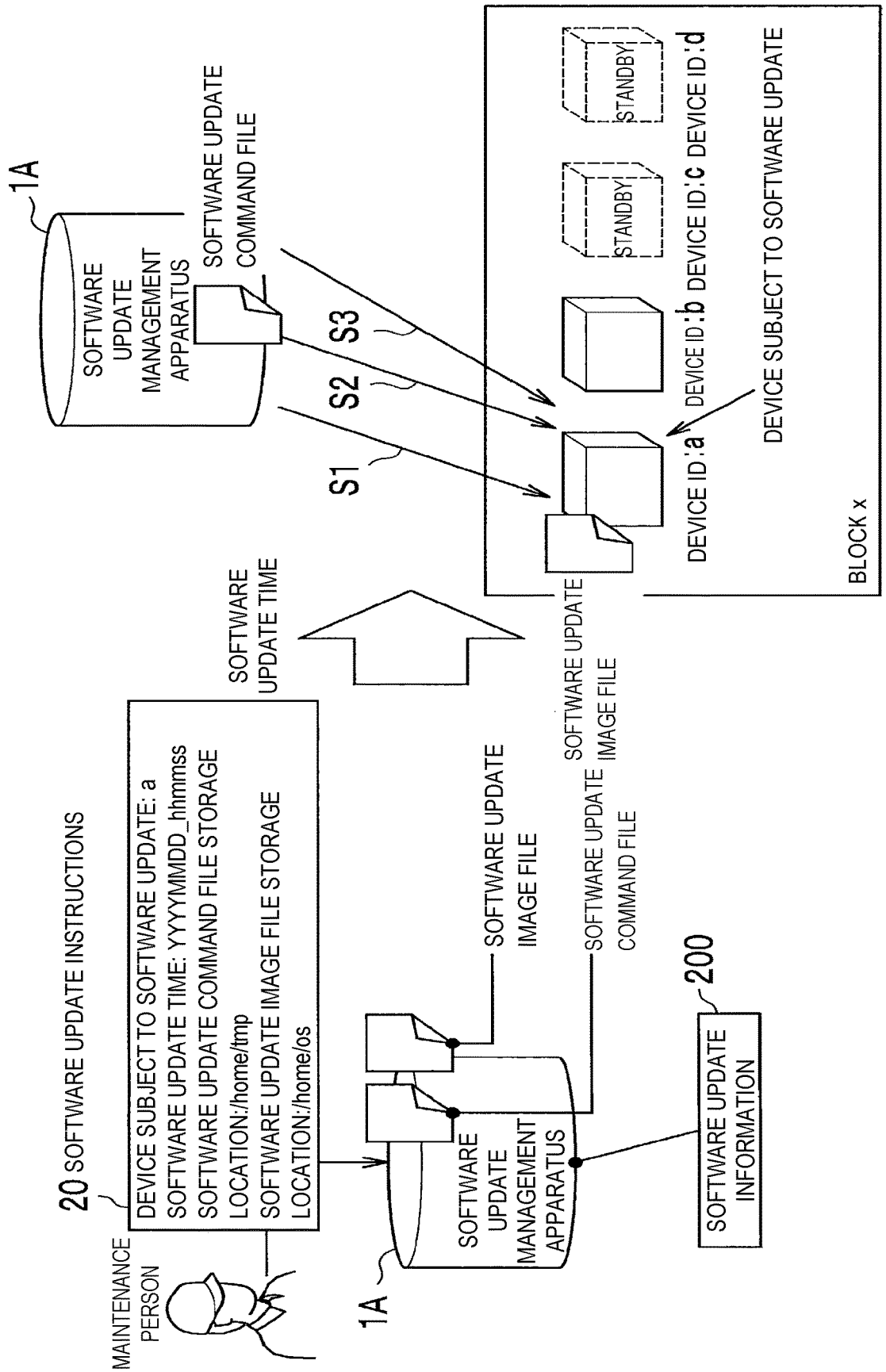
FIG. 4 is a diagram for explaining a process outline of the software update management apparatus according to the first embodiment of the present invention.

FIG. 4 is a diagram for explaining a process outline of the software update management apparatus 1A according to the first embodiment of the present invention.

As shown in FIG. 4, the software update instructions 20 contain information about "device subject to software update" and "software update time," and information about "software update command storage location" and "software update image file storage location" may be included as well.

"Device subject to software update" is identification information about each network device 5 subject to software update. For example, an ID "a" of the network device 5 is stored.

"Software update time" stores the start time of a software update process, for example, in year/month/day/hour/minute/second format "YYYYMMDD_hhmmss."

"Software update command storage location" specifies a file containing commands to be executed by the software update management apparatus 1A with respect to each network device 5.

"Software update image file storage location" specifies the storage location of an upgrade image file needed in upgrading the OS.

Note that if information about "software update command file storage location" and/or "software update image file storage location" is not contained in the software update instructions 20, the software update management apparatus 1A may select and determine an appropriate command file or image file based on the information (identification information) about the network devices subject to software update.

Returning to FIG. 2, the software update information generating unit 102 stores acquired information about the software update instructions 20 as software update information 200 in the storage unit 12.

Figure 5:
FIG. 5 is a diagram illustrating by example an exemplary data organization of software update information according to the first embodiment of the present invention.

FIG. 5 is a diagram illustrating by example an exemplary data organization of the software update information 200 according to the first embodiment of the present invention.

As shown in FIG. 5, as the software update information 200, information about the software update instructions 20 is stored for each targeted device. Specifically, information about "software update time" (referred to as "update time" in FIG. 5), "command file storage location," and "image file storage location" is stored by being associated with "device subject to software update" (referred to as "targeted device" in FIG. 5). Note that, for example, if the software update instructions 20 do not include information about "software update image file storage location," the software update information 200 contains "-" by assuming that the OS is not updated.

Returning to FIG. 2, the software updating unit 103, which monitors the "update time" in the software update information 200, performs a software update process for the device subject to software update when the time indicated by the "update time" comes.

Specifically, as shown in FIG. 4, when the software update time comes, the software updating unit 103 transfers the traffic being processed by the device subject to software update to a standby device in the same block (step S1). Next, the software updating unit 103 executes a command indicated by the software update command file (step S2). In so doing, if an image file storage location is specified in the software update information 200, the software updating unit 103 transfers the software update image file by assuming that the OS needs upgrading. Then, the software updating unit 103 returns the transferred traffic from the standby device to the active device subjected to the software update (step S3).

<<Process Flow>>

Next, a process flow of the software update management apparatus 1A will be described.

Figure 6:
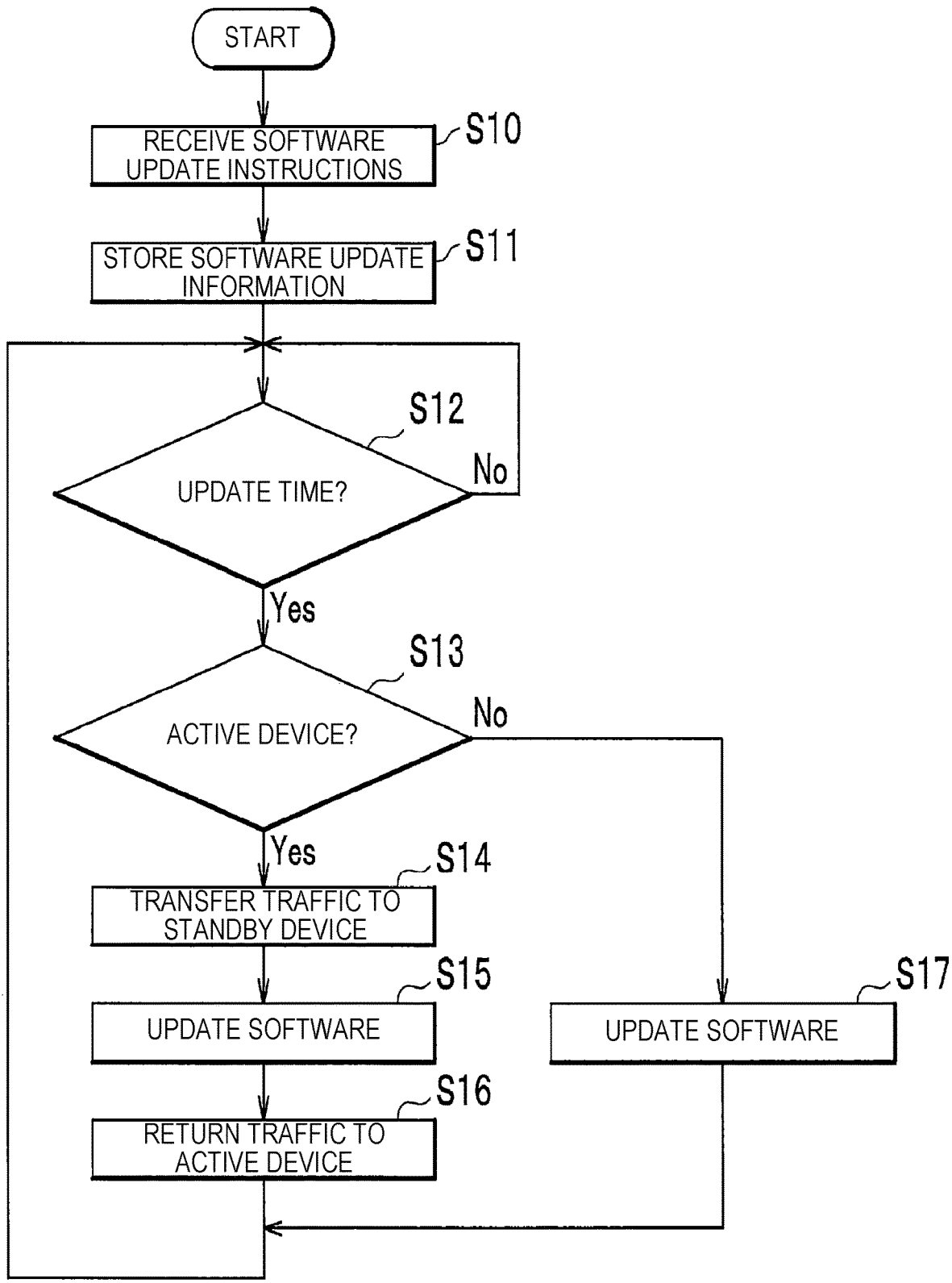
FIG. 6 is a flowchart showing a process flow of the software update management apparatus according to the first embodiment of the present invention.

FIG. 6 is a flowchart showing a process flow of the software update management apparatus 1A according to the first embodiment of the present invention.

It is assumed here that the information obtained by dividing the network to be controlled into one or more blocks is stored in advance as the block management information 100 (FIG. 3) in the storage unit 12 of the software update management apparatus 1.

First, from the operator terminal (not shown) or the like, the software update management apparatus 1A (update instruction receiving unit 101) receives software update instructions 20 (see FIG. 4) containing identification information about each network device 5 subject to software update and the start time of the software update process (step S10). Then, the update instruction receiving unit 101 outputs the received software update instructions 20 to the software update information generating unit 102.

Next, based on the acquired information about the software update instructions 20, the software update information generating unit 102 generates software update information 200 and stores the information in the storage unit 12 (step S11).

Next, the software updating unit 103 monitors the "update time" in the software update information 200 in the storage unit 12 and determines whether the present time has reached any of the times set in the "update time" (step S12).

If it is determined that the present time is not the update time (No in step S12), the software updating unit 103 waits until the update time comes. On the other hand, if it is determined that the present time is the update time (Yes in step S12), the software updating unit 103 goes to step S13 next.

Next, the software updating unit 103 performs the software update process shown in steps S1 to S3 in FIG. 4.

Specifically, first, the software updating unit 103 identifies the device-subject-to-software-update (network device 5) determined to have reached the update time based on the software update information 200 (see FIG. 5). Then, the software updating unit 103 determines whether the device subject to software update (network device 5) is an active device (step S13). That is, the software updating unit 103 determines whether the network device 5 is an active device or standby device.

Here, if the determination result indicates an active device (Yes in step S13), the software updating unit 103 transfers the traffic being processed by the device subject to software update (network device 5) to a standby device in the same block (step S14).

Next, by referring to the software update information 200, the software updating unit 103 executes a command indicated by a software update command file (step S15: software update process). In so doing, if an image file storage location is specified in the software update information 200, the software updating unit 103 transfers the software update image file by assuming that the OS needs upgrading.

Then, when the update is complete, the software updating unit 103 returns the transferred traffic from the standby device to the active device subjected to the software update (step S16). Then, the software updating unit 103 returns to step S12 and continues processing.

On the other hand, if the determination result indicates a standby device rather than an active device (No in step S13), the software updating unit 103 goes to step S17.

In step S17, by referring to the software update information 200, the software updating unit 103 executes a command indicated by the software update command file as with step S15. In so doing, if an image file storage location is specified in the software update information 200, the software updating unit 103 transfers the software update image file by assuming that the OS needs upgrading. Then, the software updating unit 103 returns to step S12 and continues processing.

Consequently, on the network to be controlled, the software update management apparatus 1A according to the first embodiment of the present invention can automatically update software in the network devices 5 under its management on a block by block basis, i.e., simultaneously in the plural network devices, without affecting traffic.

Second Embodiment

Next, the network management system 1000 including a software update management apparatus 1B (see FIG. 7 described later) according to a second embodiment will be described. Note that the overall configuration of the second embodiment is similar to the system shown in FIG. 1.

The software update management apparatus 1B according to the second embodiment has the following features.

As with the software update management apparatus 1A according to the first embodiment, the software update management apparatus 1B according to the second embodiment holds block management information 100 (FIG. 3), which is information obtained by dividing the network to be controlled into one or more blocks. Also, the software update management apparatus 1B prestores the target unavailability (details will be described later) of the entire network to be controlled. Then, the software update management apparatus 1B receives instruction information ("update-every-network-device instructions 25" described later) instructing that the software in all the network devices 5 in the controlled network be updated at once. The software update management apparatus 1B brings the unavailability of the entire controlled network during software update to or below the target unavailability of the entire network and calculates the schedule that will minimize the software update time. Specifically, the software update management apparatus 1B calculates, on a block by block basis, the maximum simultaneous software update count that satisfies the target unavailability of the entire network. Then, the software update management apparatus 1B sets a schedule for updating the software in each block by meeting the calculated maximum simultaneous software update count and updates the software in the network devices 5 to be controlled.

Consequently, the software update management apparatus 1B according to the present embodiment can ensure efficiency of software update operations while maintaining the reliability of the entire network during the software update operations.

Figure 7:
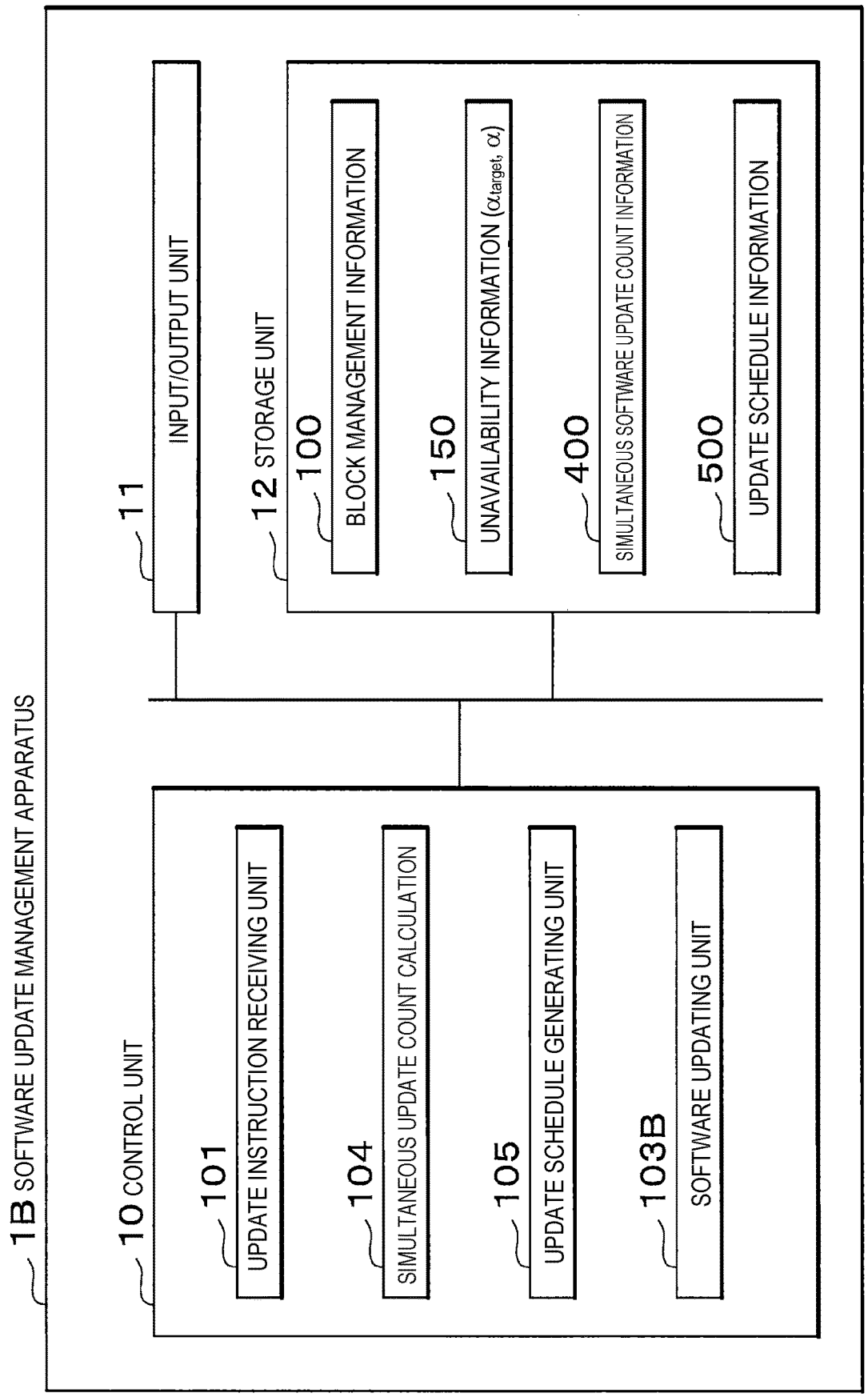
FIG. 7 is a functional block diagram showing a configuration example of a software update management apparatus according to a second embodiment of the present invention.

FIG. 7 is a functional block diagram showing a configuration example of the software update management apparatus 1B according to the second embodiment of the present invention.

Upon receiving update-every-network-device instructions 25 (FIG. 10) for all the network devices 5 in the network from the operator terminal (not shown) or the like, the software update management apparatus 1B calculates, on a block by block basis, the maximum simultaneous software update count achievable by one software update while satisfying the target unavailability of the entire network.

Then, the software update management apparatus 1B sets a schedule for updating the software in each block by meeting the calculated maximum simultaneous software update count and performs a software update process for each network device 5.

As shown in FIG. 7, the software update management apparatus 1B includes a control unit 10, an input/output unit 11, and a storage unit 12. Note that functions having the same configurations as the software update management apparatus 1A shown in FIG. 2 are denoted by the same names and reference signs as the corresponding functions in FIG. 2, and detailed description thereof will be omitted.

As with the first embodiment, block management information 100 (FIG. 3), which indicates the active devices and standby devices belonging to each block, is stored in the storage unit 12.

Also, information about the target unavailability ("$\alpha_{target}$") of the entire network and the unavailability ("$\alpha$") of each individual device is stored as unavailability information 150 in the storage unit 12.

Here, the unavailability represents "traffic failure probability," which is the probability that a traffic failure occurs. The unavailability ($\alpha$) of each individual network device is found using Expression 1 below.

$$\text{Unavailability } (\alpha) = \text{MTTR} \div (\text{MTBF} + \text{MTTR}) \quad \text{(Expression 1)}$$

MTTR is the mean time to repair. MTBF is the mean time between failures. Note that an exemplary technique for calculating the unavailability of the entire network will be described later.

The unavailability ($\alpha$) of each individual network device 5 and the "target unavailability of the entire network" ($\alpha_{target}$) that indicates the target unavailability of the entire network are stored in advance in the storage unit 12.

The storage unit 12 also stores simultaneous software update count information 400 (FIG. 8) calculated by a simultaneous update count calculation unit 104 described later and update schedule information 500 (FIG. 10) generated by an update schedule generating unit 105 described later.

Note that the storage unit 12 temporarily stores programs for use to make the control unit 10 execute various functions and information needed for processes of the control unit 10.

Returning to FIG. 7, the control unit 10, which takes charge of overall processes of the software update management apparatus 1B, includes the update instruction receiving unit 101, the simultaneous update count calculation unit 104, the update schedule generating unit 105, and a software updating unit 103B.

The update instruction receiving unit 101 receives update-every-network-device instructions 25 (FIG. 10), i.e., instruction information instructing that the software in all the network devices 5 in the controlled network be updated at once, from the operator terminal (not shown) or the like. Upon receiving the update-every-network-device instructions 25, the update instruction receiving unit 101 outputs the information thereon to the simultaneous update count calculation unit 104.

The update-every-network-device instructions 25 contain times at which software update is started for all the network devices and intervals (software update intervals) among software updates carried out multiple times for different blocks.

The update instruction receiving unit 101 receives update-every-network-device instructions 25 such as shown, for example, in FIG. 10 described later. The update-every-network-device instructions 25 contain "ALL" as "devices subject to software update," indicating all the network devices 5.

"Software update start time" contains the start time of all the software update processes, for example, in year/month/day/hour/minute/second format "YYYYMMDD_hhmmss." "Software update interval" contains intervals, such as "30 minutes," among starts of software update sessions. That is, the second software update session is started 30 minutes after the first software update session is started, and the subsequent update software sessions are run at 30-minute intervals.

Information about "software update command file storage location" and "software update image file storage location" is similar to the information contained in the software update instructions 20 (FIG. 4) according to the first embodiment. Note that if it is desired to vary command processing and image file transmission among the network devices 5, information about command files and image files corresponding to the individual network devices 5 may be stored in the storage unit 12 in advance.

Returning to FIG. 7, the simultaneous update count calculation unit 104 calculates, on a block by block basis, the simultaneous software update count indicating a maximum number of network devices able to be updated by one software update while satisfying the target unavailability of the entire network.

A block-by-block, simultaneous software update count calculation process performed by the simultaneous update count calculation unit 104 will be described below with reference to FIGS. 8 and 9.

Figure 8:
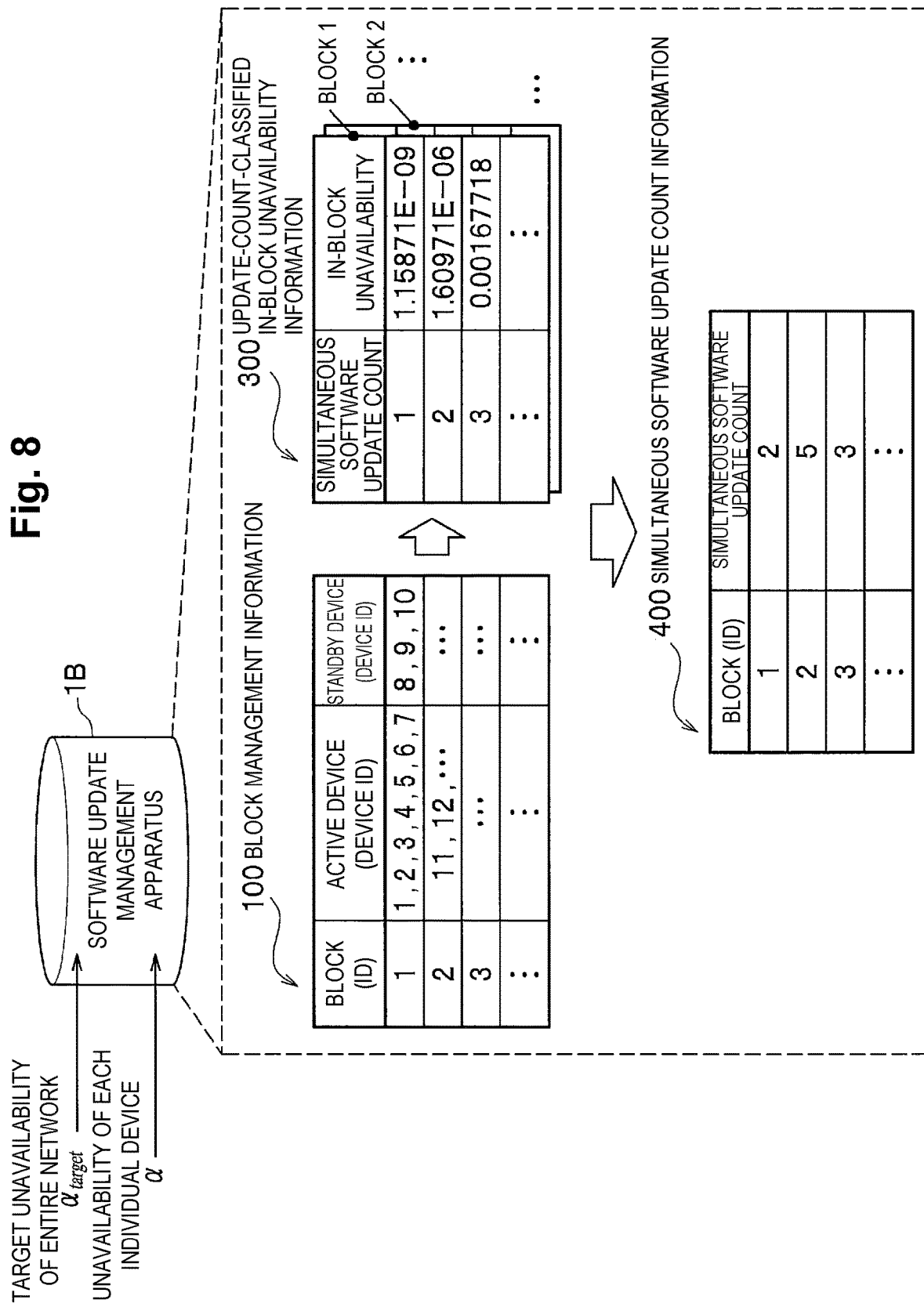
FIG. 8 is a diagram for explaining an outline of a block-by-block, simultaneous software update count calculation process performed by a simultaneous update count calculation unit according to the second embodiment of the present invention.

FIG. 8 is a diagram for explaining an outline of the block-by-block, simultaneous software update count calculation process performed by the simultaneous update count calculation unit 104. FIG. 9 is a diagram for explaining an example of a calculation technique for the block-by-block, simultaneous software update count calculation process performed by the simultaneous update count calculation unit 104.

As shown in FIG. 8, the target unavailability ($\alpha_{target}$) of the entire network and the unavailability ($\alpha$) of each individual network device 5 are stored in advance in the software update management apparatus 1B. Note that the unavailability ($\alpha$) of each individual device may be calculated for each network device 5 using Expression 1 described above, but it is assumed in the following description for ease of explanation that all the network devices 5 have the same unavailability ($\alpha$) on a single device basis.

First, the simultaneous update count calculation unit 104 calculates the unavailability of the entire network using the unavailability ($\alpha$) of each individual device and the block management information 100 (FIG. 8), which indicates the active devices and standby devices belonging to each block. Various techniques (predetermined techniques) are applicable as techniques for calculating the unavailability (traffic failure probability) of the entire network, and an example of the predetermined techniques will be described below.

Figure 9:
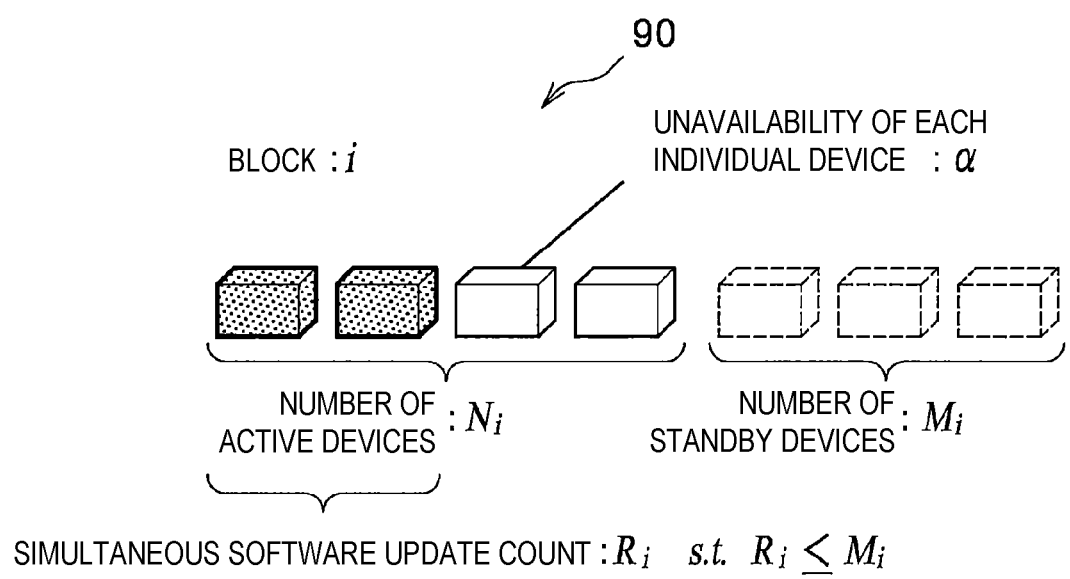
FIG. 9 is a diagram for explaining an example of a calculation technique for the block-by-block, simultaneous software update count calculation process performed by the simultaneous update count calculation unit according to the second embodiment of the present invention.

As indicated under reference sign 90 in FIG. 9, in block "i," let "$\alpha$" denote the unavailability of each individual network device 5, let "Ni" denote the number of active devices, and let "Mi" denote the number of standby devices. Also, let "Ri" denote the simultaneous software update count. Here, it is assumed that the simultaneous software update count is equal to or smaller than the number of standby devices (Ri≤Mi).

In this case, in-block unavailability "Wi" in block i going through software update is calculated using Expression 2 below.

[Math. 1]

$$w_i = \sum_{k=M_i-R_i+1}^{N_i+M_i-R_i} \binom{N_i + M_i - R_i}{k} \alpha^k (1-\alpha)^{N_i+M_i-R_i-k} \quad \text{(Expression 2)}$$

Wi indicates the probability that a simultaneous failure count (k) will be larger than the number (Mi−Ri) of operating standby devices.

Note of Expression 2 above, the part in parentheses below (Expression 2-1) indicates the number of combinations for selecting k devices from Ni+Mi−Ri devices.

[Math. 2]

$$\binom{N_i + M_i - R_i}{k} \quad \text{(Expression 2-1)}$$

Also, of Expression 2, the following part (Expression 2-2) indicates the probability that k devices out of (Ni+Mi−Ri) devices will fail simultaneously, where (Ni+Mi−Ri) is the number of devices calculated by subtracting the number of devices going through software update from the number (Ni+Mi) of all the devices.

[Math. 3]

$$\binom{N_i + M_i - R_i}{k} \alpha^k (1-\alpha)^{N_i+M_i-R_i-k} \quad \text{(Expression 2-2)}$$

Based on Expression 2 above, which represents in-block unavailability (Wi), "in-block unavailability classified by simultaneous software update count" in each block (update-count-classified in-block unavailability 300 in FIG. 8) can be found.

Also, the unavailability (W) of the entire network is calculated using Expression 3 below.

[Math. 4]

$$W = 1 - \prod_{i=1}^{Block} (1 - w_i) \quad \text{(Expression 3)}$$

Here, of Expression 2, the following part (Expression 3-1) indicates the probability that no traffic failure will occur in any of the block.

[Math. 5]

$$\prod_{i=1}^{Block} (1 - w_i) \quad \text{(Expression 3-1)}$$

The simultaneous update count calculation unit 104 solves an optimization problem indicated by Expression 4 below using target unavailability of the entire network ($\alpha_{target}$) and the calculated unavailability (W) of the entire network. That is, the simultaneous update count calculation unit 104 calculates the software update count (Ri) that satisfies the constraint $\alpha_{target} \geq W$ and minimizes the target function $\alpha_{target} - W$, as follows:

[Math. 6]

Derive the Ri that minimizes the following:

$$\alpha_{target} W \ s.t. \ \alpha_{target} \geq W \quad \text{(Expression 4)}$$

By calculating Expression 4 above, the simultaneous update count calculation unit 104 calculates the simultaneous software update count R in each block. Then, the simultaneous update count calculation unit 104 stores calculation results in the storage unit 12 as the simultaneous software update count information 400 shown in FIG. 8.

In the example of the simultaneous software update count information 400 shown in FIG. 8, the simultaneous software update count of block "1" is calculated as "2," and the simultaneous software update counts of blocks "2" and "3" are calculated as "5" and "3," respectively.

Returning to FIG. 7, using the simultaneous software update count information 400 (FIG. 8) calculated by the simultaneous update count calculation unit 104, the update schedule generating unit 105 determines the software update count of each block that can be achieved by one software update and generates a schedule (update schedule information 500) that indicates when software can be updated in all the network devices 5 in each block.

Figure 10:
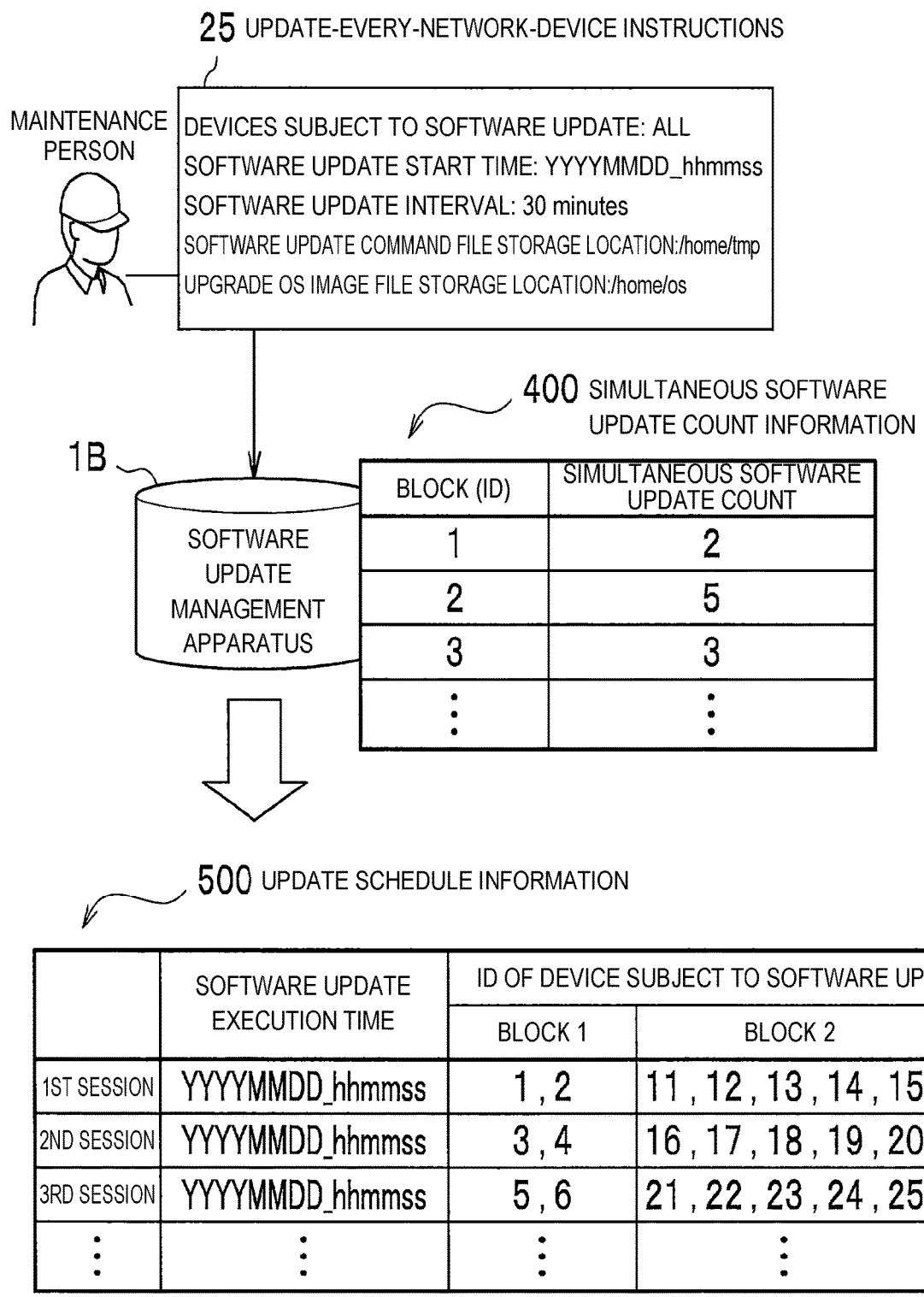
FIG. 10 is a diagram for explaining how update schedule information is generated by an update schedule generating unit according to the second embodiment of the present invention.

FIG. 10 is a diagram for explaining how the update schedule information 500 is generated by the update schedule generating unit 105.

Based on "software update start time" and "software update interval" contained in the update-every-network-device instructions 25, the update schedule generating unit 105 determines "software update execution time" in each software update session. Also, based on the simultaneous software update count information 400, the update schedule generating unit 105 selects as many network devices 5 in each block in each update session as are simultaneously subjected to software update in each block. In the example shown in FIG. 10, in block 1, whose simultaneous software update count is "2," network devices "1" and "2" are selected in the first update session and network devices "3" and "4" are selected in the second update session. Also, in block 2, whose simultaneous software update count is "5," network devices "11," "12," "13," "14," and "15" are selected in the first update session and network devices "16," "17," "18," "19," and "20" are selected in the second update session. In generating the update schedule information 500, it is free to update any network devices 5 in any order in each block. For example, the network devices 5 may be selected in ascending order as shown in FIG. 10, in descending order, or at random.

Also, regarding the software update interval, in each software update session, even if not specified specifically, the next software update may be set to be started when software updates for all the blocks are completed.

Returning to FIG. 7, based on the update schedule information 500 (FIG. 10) generated by the update schedule generating unit 105, the software updating unit 103B runs, in parallel, software updates assigned to software update sessions for the network devices 5.

Note that as with the software updating unit 103 according to the first embodiment, the software updating unit 103B transfers the traffic being processed by the device subject to software update (active device) to a standby device in the same block, executes a command indicated by the software update command file, and transfers the software update image file as required. Then, the software updating unit 103B returns the transferred traffic from the standby device to the active device subjected to the software update.

Figure 11:
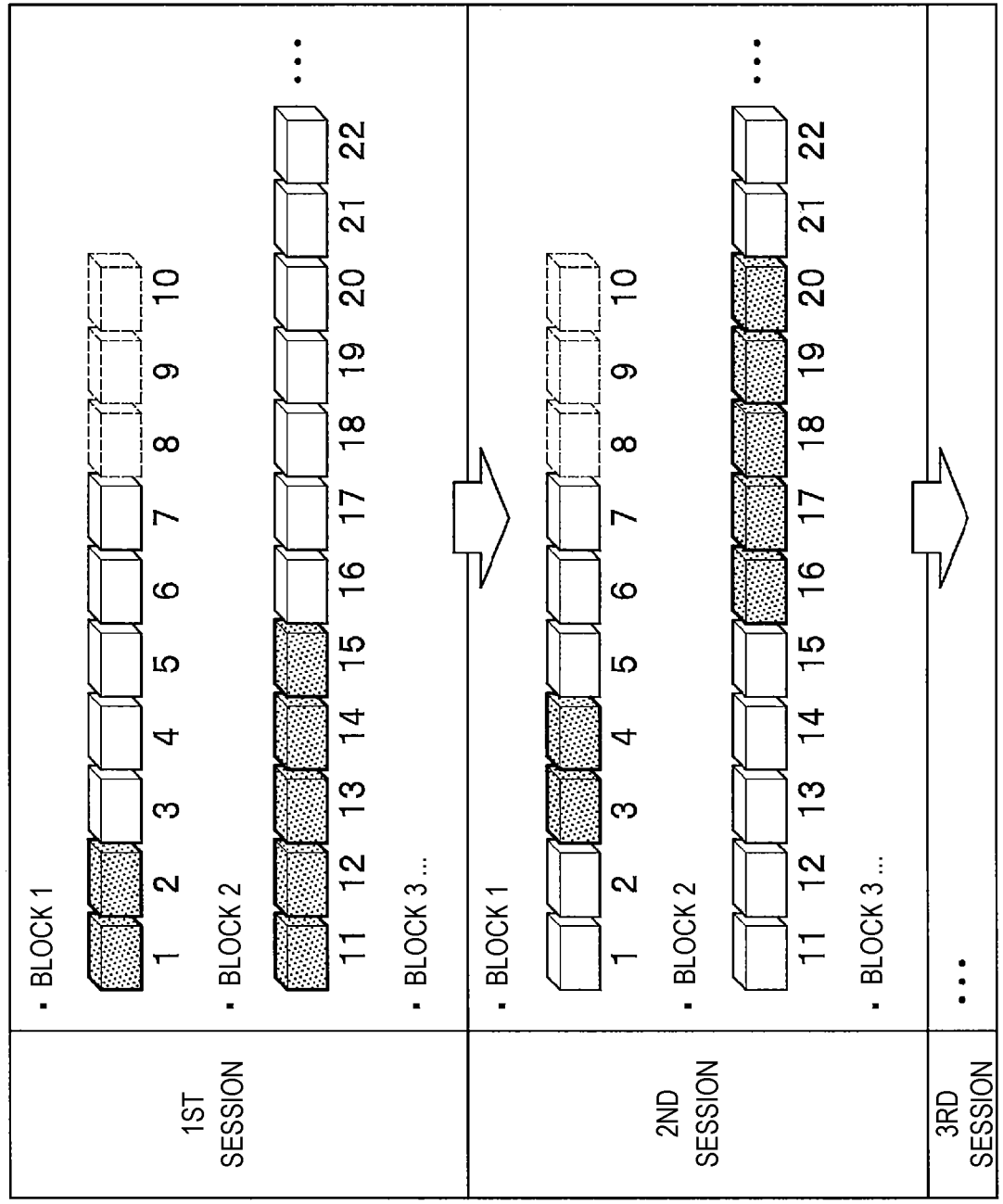
FIG. 11 is a diagram for explaining software updates made for different blocks in parallel by a software updating unit according to the second embodiment of the present invention in each software update session.

FIG. 11 is a diagram for explaining software updates made for different blocks in parallel by the software updating unit 103B in each software update session.

As shown in FIG. 11, in the first software update session, in block 1, for example, two network devices, i.e., network devices "1" and "2," are simultaneously subjected to software update. In block 2, for example, five network devices, i.e., network devices "11," "12," "13," "14," and "15" are simultaneously subjected to software update. This is true to block 3 and subsequent blocks.

Then, when the first software update session for all the blocks is completed, the software updating unit 103B automatically runs the second and subsequent software updates according to the update schedule information 500.

<<Process Flow>>

Figure 12:
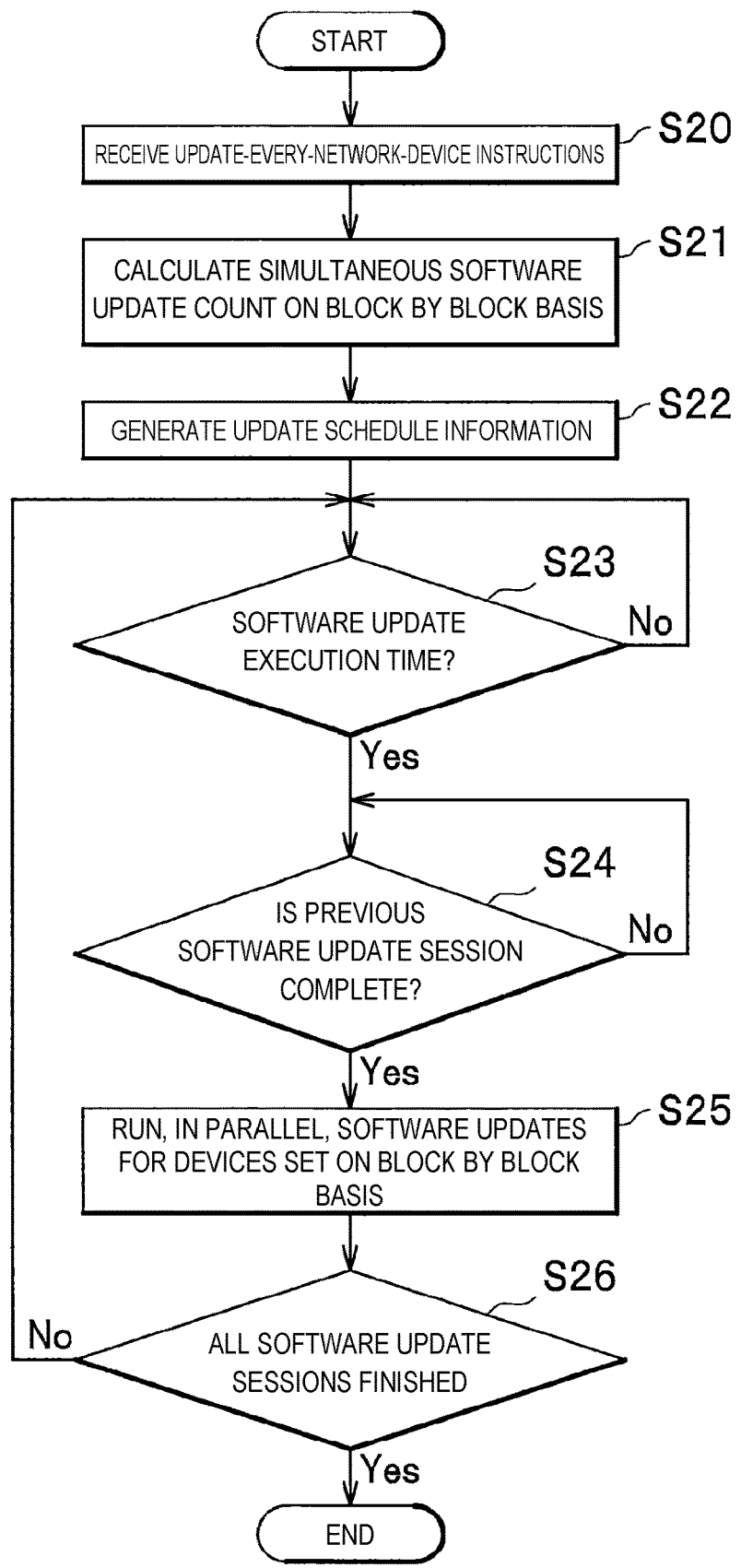
FIG. 12 is a flowchart showing a process flow of the software update management apparatus according to the second embodiment of the present invention.

Next, a process flow of the software update management apparatus 1B will be described. FIG. 12 is a flowchart showing a process flow of the software update management apparatus 1B according to the second embodiment of the present invention.

It is assumed here that the information obtained by dividing the network to be controlled into one or more blocks is stored in advance as the block management information 100 (FIG. 3) in the storage unit 12 of the software update management apparatus 1. Also, information about the target unavailability ($\alpha_{target}$) of the entire network and the unavailability ($\alpha$) of each individual network device 5 are stored in advance as unavailability information 150 in the storage unit 12.

First, the software update management apparatus 1B (update instruction receiving unit 101) receives update-every-network-device instructions 25 (see FIG. 10), i.e., instruction information instructing that the software in all the network devices 5 in the controlled network be updated at once, from the operator terminal (not shown) or the like (step S20). Then, the update instruction receiving unit 101 outputs the received update-every-network-device instructions 25 to the simultaneous update count calculation unit 104.

Next, the simultaneous update count calculation unit 104 calculates, on a block by block basis, the simultaneous software update count indicating the maximum number of network devices able to be updated by one software update while satisfying the target unavailability of the entire network and generates simultaneous software update count information 400 (FIG. 8).

In so doing, the simultaneous update count calculation unit 104 calculates the unavailability of the entire network using the unavailability ($\alpha$) of each individual device and the block management information 100 (FIG. 8), which indicates the active devices and standby devices belonging to each block. Then, the simultaneous update count calculation unit 104 calculates, on a block by block basis, a maximum simultaneous software update count (R) at which the unavailability (W) of the entire network approaches closest to the target unavailability ($\alpha_{target}$) of the entire network (step S21).

Next, using the simultaneous software update count information 400 (FIG. 8) calculated by the simultaneous update count calculation unit 104, the update schedule generating unit 105 determines the software update count that can be achieved in each block by one software update and generates the update schedule information 500 (FIG. 10) (step S22). In so doing, based on "software update start time" and "software update interval" contained in the update-every-network-device instructions 25, the update schedule generating unit 105 determines "software update execution time" in each software update session.

Then, the software updating unit 103B monitors "software update execution time" in the update schedule information 500 (FIG. 10) in the storage unit 12 and determines whether the present time has reached the time set as the software update execution time (step S23).

If it is determined that the present time is not the software update execution time (No in step S23), the software updating unit 103B waits until the software update execution time comes. On the other hand, if it is determined that the present time is the software update execution time (Yes in step S23), the software updating unit 103B goes to step S24 next.

Next, if there was any previous software update session, the software updating unit 103B determines whether software update in the previous software update session is complete in all the blocks (step S24).

Here, if there is any block in which software update is not complete (No in step S24), the software updating unit 103B waits until the network update of the network devices 5 in the network update session is complete in the block. On the other hand, if the previous network update in all the blocks is complete, (Yes in step S24), the software updating unit 103B goes to step S25 next.

In step S25, based on the update schedule information 500 in the storage unit 12, the software updating unit 103B runs, in parallel, the software updates for the network devices 5 set on a block by block basis in the network update session.

Note that in so doing, as with the software updating unit 103 according to the first embodiment, the software updating unit 103B determines whether the network devices 5 to be subjected to update are active devices or standby devices, and runs software update after transferring the traffic to standby devices if the network devices 5 are active devices.

Next, the software updating unit 103B determines whether all the software update sessions set in the update schedule information 500 have been processed (step S26). That is, the software updating unit 103B determines whether software updates for all the network devices 5 in the network to be controlled have been finished.

If there is any software update session yet to be run (No in step S26), the software updating unit 103B returns to step S23 and continues processing. On the other hand, if all the software update sessions have been processed (Yes in step S26), the software updating unit 103B finishes the software update process by determining that the software updates for all the network devices 5 in the network to be controlled have been finished.

<<Experimental Example>>

Next, an experimental example of an automation technique for an update schedule implemented by the software update management apparatus 1B according to the second embodiment will be described.

Figures 13, 14:
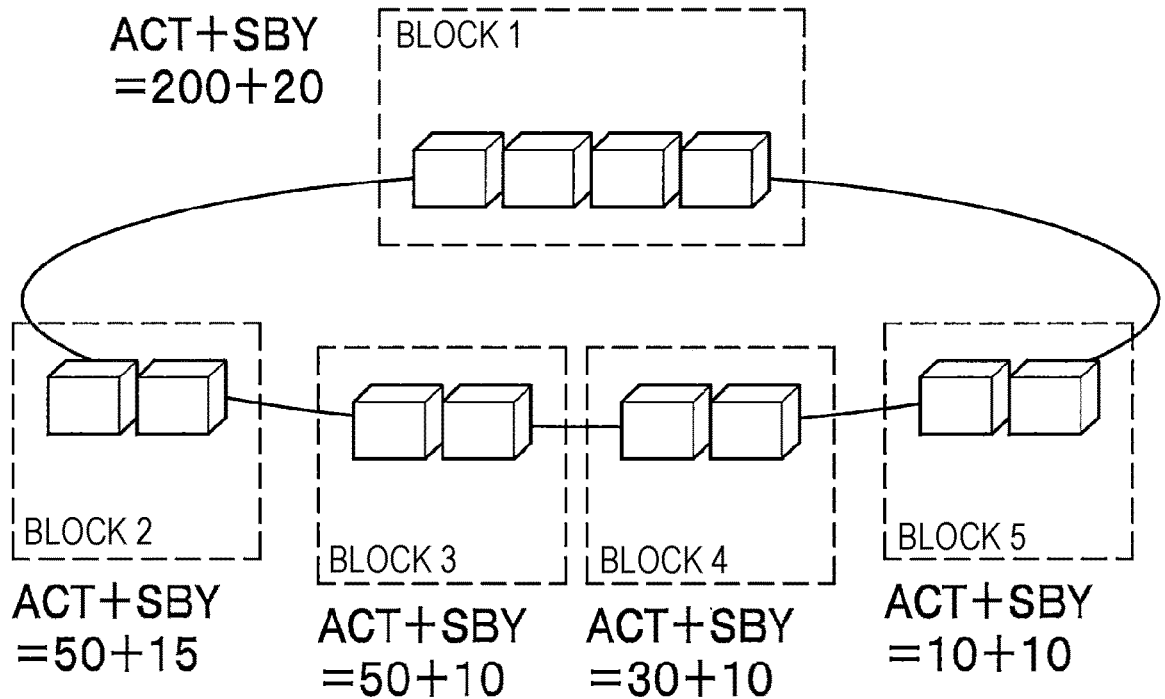
FIG. 13 is a diagram showing a configuration example of a network controlled by the software update management apparatus according to the second embodiment of the present invention.
FIG. 14 is a diagram showing experimental results produced by the software update management apparatus according to the second embodiment of the present invention by calculating the unavailability of an entire network and simultaneous software update counts.

FIG. 13 is a diagram showing a configuration example of the network controlled by the software update management apparatus 1B according to the second embodiment of the present invention.

The network to be controlled is divided into five blocks (blocks 1 to 5) each including active devices (ACT) and standby devices (SBY). As shown in FIG. 13, block 1 includes 200 active devices (ACT) and 20 standby devices (SBY). Block 2 includes 50 active devices (ACT) and 15 standby devices (SBY). Block 3 includes 50 active devices (ACT) and 10 standby devices (SBY). Block 4 includes 30 active devices (ACT) and 10 standby devices (SBY). Block 5 includes 10 active devices (ACT) and 10 standby devices (SBY).

The unavailability ($\alpha$) of each individual network device 5 is $\alpha=0.0002$. Here, it is assumed that MTBF=200,000 [h] and MTTR=48 [h]. Also, the target unavailability ($\alpha_{target}$) of the entire network is $\alpha_{target}=0.000001$.

Under these conditions, the simultaneous update count calculation unit 104 of the software update management apparatus 1B performed calculations using Expressions 2 to 4, and thereby obtained results shown in FIG. 14. As shown in FIG. 14, the unavailability (W) of the entire network is "0.000000891," which is lower than the target unavailability ($\alpha_{target}$) of the entire network. Then, the simultaneous software update count was "17" in block 1, "13" in block 2, "8" in block 3, "8" in block 4, and "8" in block 5.

Figure 15:
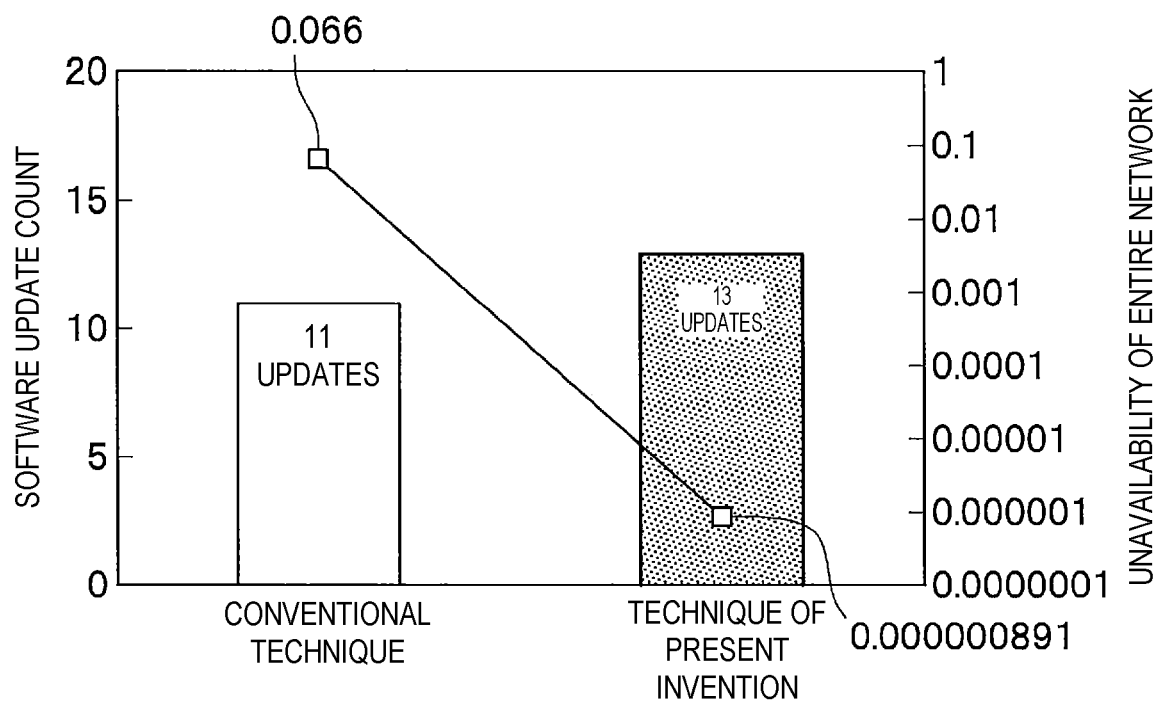
FIG. 15 is a diagram showing experimental results produced by comparing a technique of the software update management apparatus according to the second embodiment of the present invention with a conventional technique.

FIG. 15 is a diagram comparing a case in which software update is run using all the standby devices in each block without setting up any particular plan (referred to as a "conventional technique") with a case in which software update is run according to an update schedule implemented by the software update management apparatus 1B according to the second embodiment of the present invention (referred to as a "technique of the present invention").

With the conventional technique, the unavailability (W) of the entire network was "0.066," which was higher than the target unavailability ($\alpha_{target}$) of the entire network. With the technique of the present invention, the number of software updates was greater than the conventional technique, but the simultaneous software update count of each block was able to be found with the unavailability (W) of the entire network kept to or below the target unavailability ($\alpha_{target}$) of the entire network.

As has been described above, the software update management apparatus 1B according to the second embodiment of the present invention can ensure efficiency of software update operations while maintaining the reliability of the entire network during the software update operations. That is, the software update management apparatus 1B makes it possible to generate and implement a software update schedule that can minimize the time required for software update without exceeding the target unavailability ($\alpha_{target}$) of the entire network.

REFERENCE SIGNS LIST 1, 1A, 1B Software update management apparatus
5 Network device
10 Control unit
11 Input/output unit
13 Storage unit
100 Block management information
101 Update instruction receiving unit
102 Software update information generating unit
103, 103B Software updating unit
104 Simultaneous update count calculation unit
105 Update schedule generating unit
150 Unavailability information
200 Software update information
300 Update-count-classified in-block unavailability information
400 Simultaneous software update count information
500 Update schedule information

The invention claimed is:

1. A software update management apparatus configured to update software in a plurality of network devices making up a network, the software update management apparatus comprising:
    a storage unit configured to divide the network into one or more blocks and store block management information, which includes information about the network devices belonging to each of resulting blocks and information indicating whether each of the network devices is an active device or a standby device;
    an update instruction receiving unit, including one or more processors, configured to receive software update instructions containing devices subject to software update, which are network devices subject to software update, and a software update time, which is a start time of a software update process for each of the devices subject to software update;
    a software update information generating unit, including one or more processors, configured to generate software update information including the software update time associated with each of the devices subject to software update, based on the received software update instructions; and
    a software updating unit, including one or more processors, configured to determine whether each of the devices subject to software update is an active device or a standby device based on the block management information when the software update time comes according to the software update information, perform software update processes after transferring traffic that is being processed by the devices subject to software update, which are active devices, to standby devices in same blocks as the respective active devices when it is determined that the devices subject to software update are active devices or perform software update processes for the devices subject to software update, which are standby devices, when it is determined that the devices subject to software update are standby devices, and thereby perform the software update processes for active devices or standby devices in different blocks in parallel.

2. The software update management apparatus according to claim 1, wherein during the software update processes, the software updating unit is configured to: determine whether each of the network devices in which the software is updated is an active device or a standby device based on the block management information and perform a software update process after transferring traffic that is being processed by the network devices, which are active devices, to standby devices in the same blocks as the respective active devices when it is determined that the network devices are active devices or perform software update processes for the network devices, which are standby devices, when it is determined that the network devices are standby devices.

3. A software update management apparatus configured to update software in a plurality of network devices making up a network, the software update management apparatus comprising:
    a storage unit configured to divide the network into one or more blocks and store block management information, which includes information about the network devices belonging to each of resulting blocks and information indicating whether each of the network devices is an active device or a standby device, unavailability of each individual one of the network devices, and target unavailability of the network;

an update instruction receiving unit, including one or more processors, configured to receive update-every-network-device instructions containing information indicating that all the network devices in the network are subject to software update;

a simultaneous update count calculation unit, including one or more processors, configured to calculate unavailability of the network by a predetermined technique that uses the block management information and the unavailability of each individual one of the network devices and thereby calculate a simultaneous software update count on a block by block basis such that the unavailability of the network is kept equal to or lower than the target unavailability of the network, the simultaneous software update count indicating a maximum number of network devices able to be updated by one software update;

an update schedule information generating unit, including one or more processors, configured to generate update schedule information by selecting network devices in each of the blocks, where the selected network devices update software in each software update session, the software being updated in the number of network devices indicated by the simultaneous software update count calculated for each of the blocks; and a software updating unit, including one or more processors, configured to perform software update processes for the selected network devices in each software update session with reference to the update schedule information by performing the software update processes in different blocks in parallel.

4. The software update management apparatus according to claim 3, wherein during the software update processes, the software updating unit is configured to: determine whether each of the network devices in which the software is updated is an active device or a standby device based on the block management information and perform a software update process after transferring traffic that is being processed by the network devices, which are active devices, to standby devices in the same blocks as the respective active devices when it is determined that the network devices are active devices or perform software update processes for the network devices, which are standby devices, when it is determined that the network devices are standby devices.

5. A software update management method for a software update management apparatus that updates software in a plurality of network devices making up a network, wherein the software update management apparatus includes a storage unit configured to divide the network into one or more blocks and store block management information, which includes information about the network devices belonging to each of resulting blocks and information indicating whether each of the network devices is an active device or a standby device, the software update management method executing:
receiving software update instructions containing devices subject to software update, which are network devices subject to software update, and a software update time, which is a start time of a software update process for each of the devices subject to software update;

generating software update information including the software update time associated with each of the devices subject to software update, based on the received software update instructions; and determining whether each of the devices subject to software update is an active device or a standby device based on the block management information when the software update time comes according to the software update information, performing software update processes after transferring traffic that is being processed by the devices subject to software update, which are active devices, to standby devices in same blocks as the respective active devices when it is determined that the devices subject to software update are active devices or performing software update processes for the devices subject to software update, which are standby devices when it is determined that the devices subject to software update are standby devices, and thereby performing the software update processes for active devices or standby devices in different blocks in parallel.

6. The software update management method according to claim 5, wherein the software update management apparatus includes unavailability of each individual one of the network devices, and target unavailability of the network, the software update management method executing:
receiving update-every-network-device instructions containing information indicating that all the network devices in the network are subject to software update;

calculating unavailability of the network by a predetermined technique that uses the block management information and the unavailability of each individual one of the network devices and thereby calculating a simultaneous software update count on a block by block basis such that the unavailability of the network is kept equal to or lower than the target unavailability of the network, the simultaneous software update count indicating a maximum number of network devices able to be updated by one software update;

generating update schedule information by selecting network devices in each of the blocks, where the selected network devices update software in each software update session, the software being updated in the number of network devices indicated by the simultaneous software update count calculated for each of the blocks; and performing software update processes for the selected network devices in each software update session with reference to the update schedule information by performing the software update processes in different blocks in parallel.

7. The software update management method according to claim 6, further comprising:

determining whether each of the network devices in which the software is updated is an active device or a standby device based on the block management information; and performing a software update process after transferring traffic that is being processed by the network devices, which are active devices, to standby devices in the same blocks as the respective active devices when it is determined that the network devices are active devices or perform software update processes for the network devices, which are standby devices, when it is determined that the network devices are standby devices.

* * * * *